(12) United States Patent
Plooij et al.

(10) Patent No.: US 8,543,650 B2
(45) Date of Patent: Sep. 24, 2013

(54) METHOD AND SYSTEM FOR SENDING ELECTRONIC MAIL OVER A NETWORK

(76) Inventors: Teunis Plooij, Amstelveen (NL); Nico Samuel Leons, Amstelveen (NL)

( * ) Notice: Subject to any disclaimer, the term of this patent is extended or adjusted under 35 U.S.C. 154(b) by 514 days.

(21) Appl. No.: 11/665,778

(22) PCT Filed: Oct. 18, 2005

(86) PCT No.: PCT/NL2005/000749
§ 371 (c)(1),
(2), (4) Date: Apr. 17, 2007

(87) PCT Pub. No.: WO2006/043807
PCT Pub. Date: Apr. 27, 2006

(65) Prior Publication Data
US 2009/0049130 A1 Feb. 19, 2009

(30) Foreign Application Priority Data
Oct. 18, 2004 (NL) .................................. 1027274

(51) Int. Cl.
*G06F 15/16* (2006.01)
*G06F 1/00* (2006.01)
*G06F 3/048* (2013.01)

(52) U.S. Cl.
USPC ........... 709/206; 709/227; 709/229; 713/300; 715/809

(58) Field of Classification Search
USPC .................................................. 709/202–209
See application file for complete search history.

(56) References Cited

U.S. PATENT DOCUMENTS

| | | | |
|---|---|---|---|
| 5,850,219 A * | 12/1998 | Kumomura | 715/751 |
| 6,393,464 B1 * | 5/2002 | Dieterman | 709/206 |
| 2002/0107950 A1 * | 8/2002 | Lu | 709/223 |
| 2002/0169835 A1 * | 11/2002 | Paul et al. | 709/206 |
| 2004/0177271 A1 * | 9/2004 | Arnold et al. | 713/201 |
| 2005/0021637 A1 * | 1/2005 | Cox | 709/206 |
| 2005/0198511 A1 * | 9/2005 | Tomkow | 713/176 |
| 2011/0106903 A1 * | 5/2011 | Lowe | 709/206 |

FOREIGN PATENT DOCUMENTS

| | | |
|---|---|---|
| EP | 1 241 610 A | 9/2002 |
| EP | 1 365 340 A | 11/2003 |
| JP | 06187172 A * | 7/1994 |
| WO | WO 03/007178 A | 1/2003 |
| WO | WO 2004/019574 A | 3/2004 |

OTHER PUBLICATIONS

Aidan Duane et al.; Managing Email Usage: A Cross Case Analysis of Experiences With Electronic Onitoring and ; Control, 2004;ACM;229-238.*
PCT International Search Report and Written Opinion for International Application No. PCT/NL2005/000749 dated Jan. 19, 2006.
PCT International Preliminary Report on Patentability for International Application No. PCT/NL2005/000749 dated Oct. 30, 2006.

* cited by examiner

*Primary Examiner* — Ashok B. Patel
*Assistant Examiner* — Evans Desrosiers
(74) *Attorney, Agent, or Firm* — Marcus C. Dawes; Daniel L. Dawes

(57) ABSTRACT

The present invention provides a method for sending o electronic mail messages (emails) via a network such as t internet by a mail processing unit, comprising: —generating by the mail processing unit of a user's electronic mail message to be authorized, wherein the mail message comprises text image and/or sound data; —addressing of the generated unauthorized mail message by the mail processing unit; —temporarily storing the generated unauthorized mail message at the mail processing unit; —showing the unauthorized mail message to a previously specified supervisor associated with the user; —sending the authorized electronic mail message to the addressee over the network only after authorization b the supervisor.

33 Claims, 7 Drawing Sheets

METHOD AND SYSTEM FOR SENDING ELECTRONIC MAIL OVER A NETWORK

The present invention relates to a method and a system for sending electronic mail messages (emails) via a network such as internet through a mail processing unit.

The use of electronic mail; and in particular electronic mail via the internet, (email) has expanded enormously in recent years. While in the early days of internet electronic mail was intended mainly for sending relatively short informal messages back and forth, electronic mail is often used nowadays as fully equivalent to traditional regular mail, or even as a replacement thereof. It will be apparent that the use of electronic mail has a number of significant advantages over regular mail. Electronic mail is for instance faster, can be distributed more readily over a large number of addressees and has less of an impact on the environment, for instance in the sense that it requires no paper and does not involve the consumption of fuel.

A number of significant drawbacks are however also associated with the use of electronic mail. Owing to the originally informal character of electronic mail messages, users often tend to pay less attention to layout, spelling and content of the messages than would be given to a regular exchange of letters. Electronic messages are also sometimes mistakenly sent to the wrong addressees or draft messages are already sent before they have been finalized.

In order to obviate the above sated drawbacks the European document EP 1 241 610 A2 describes a system in which electronic messages can only be sent when the writer of the message has given explicit approval thereof, for instance by placing a digital signature. Although this does prevent a message being sent erroneously to a wrong address or the sending of a draft message, the problem of the informal character of the electronic message in a certain sense persists.

A further problem of the known electronic mail systems is the question of liability of the sender for possible mistakes in the exchange of letters. Many companies including insurance companies, banks, law firms, and consultancies in general, conduct correspondence with content which has the same legal status as that of a regular exchange of letters. However, because electronic messages are drawn up and sent with less care and in the existing mail systems the outgoing electronic messages can moreover not be monitored by others, such as for instance a supervisor, there is a great likelihood of incorrect information going astray. Companies can now be held liable for the damage resulting from providing incorrect information.

It is an object of the present invention to provide a method and system for sending electronic mail messages having, among others, the above stated advantages of electronic processing, in which said drawbacks of applying electronic mail, and in particular the drawback of the increased risks of liability, are obviated.

According to a first aspect of the invention, there is provided a method for sending electronic mail messages (emails) via a network such as the internet through a mail processing unit, comprising:

- generating by the mail processing unit of a user's electronic mail message to be authorized, wherein the mail message comprises text, image and/or sound data;
- addressing of the generated unauthorized mail message by the mail processing unit;
- temporarily storing the generated unauthorized mail message at the mail processing unit;
- showing the unauthorized mail message to a previously specified supervisor associated with the user;
- sending the authorized electronic mail message to the addressee over the network only after authorization by the supervisor.

The invention therefore relates to a method for sending electronic mail incorporating the possibility of obligatory approval of outgoing electronic messages of a determined user or a number of users, for instance an employee with limited authority, by one or more supervisors assigned to the user. When an employee draws up and sends an electronic message to be authorized, this message is for instance placed in the "outgoing messages" directory but not yet actually sent. Only after the supervisor has read and approved the message, can the message be sent.

In a preferred embodiment the method also comprises of generating an electronic mail message to be sent without authorization, addressing the generated mail message and sending the unauthorized mail message to the addressee over the network. This makes it possible for the user to send electronic messages which are not authorized by the supervisor, for instance messages with a content or with an addressee which it is agreed beforehand does not require authorization. In another preferred embodiment however, the method comprises of blocking the sending of all unauthorized mail messages. This means that only messages authorized by the supervisor can actually be sent.

So as to give the recipient of the electronic message an indication as to whether a message has or has not been authorized in the correct manner, and to thus make clear to the recipient which status (authorized or unauthorized) the content of the received message has, the method preferably comprises of adding to the generated mail message an indicator which indicates whether or not the mail message has been authorized. On the basis of the indicator the recipient can ascertain the status of the received message.

The method herein comprises of sending the indicator along with the mail message to the addressee, for instance separately of the message or together with the message by incorporating it into the mail message. In a particularly advantageous embodiment, the indicator is a label added to the mail message. The label contains information representative of the authorization status of the mail message, in particular (but not limited to) text data. The electronic message can for instance be provided with a piece of text indicating whether the content of the electronic message is authorized, and therefore has a determined legal status, or whether the content of the message is unauthorized and no liability for the content thereof can therefore be accepted.

In theory a user could him/herself also make the above stated addition in the form of a label. In a further preferred embodiment a digital signature of the supervisor is therefore added to the electronic message instead of or in addition to the above mentioned label. In some countries digital signatures have a legal status comparable to that of handwritten signatures. In other countries this is not the case, but the use of a digital signature can in any case greatly increase the reliability of the electronic traffic in mail messages.

Digital signatures can be realized in different ways. Signatures according to the Digital Signature Standard (DSS) are for instance generated by means of a set of rules which are included in the so-called Digital Signature Algorithm (DSA) and a number of parameters, so that the identity of the signature and the integrity of the sent data can be verified. Use is made herein of two digital keys, a public key accessible to everyone and a private key known only to the user. With such a digital signature the messages can be monitored with a very high degree of reliability. Furthermore, two-way authorization hereby becomes possible. Within the company of the sender, certainty will be wanted as to whether monitoring has taken place, and the recipient moreover wishes to know with certainty that monitoring has actually taken place.

In a further embodiment the method comprises of showing the user the authorization status of the mail message generated by the user, so that the user is kept informed of the fact of whether the message has been sent or not. In a further embodiment the supervisor is likewise shown whether the mail messages generated by one or more users have already been authorized by the relevant supervisor. In either case, whether a mail message is authorized or unauthorized can be designated with different colours and/or different symbols.

The method preferably comprises of linking each of the users of the mail processing unit to one or more associated supervisors, by making use of relations between the different users and supervisors that are pre-stored in the mail processing unit.

The method preferably comprises, after sending of an electronic mail message, of receiving an electronic receipt confirmation message from the addressee and linking the receipt confirmation message to the originally sent electronic mail message. The receipt confirmation message can be representative of the technical receipt of the sent mail message and/or representative of the mail message being opened. In the latter case the mail message has not only been received, but also opened (and probably also read). When receipt confirmations are returned, the method can further comprise of making an overview of the electronic mail messages sent by the mail processing unit and the receipt of electronic receipt confirmation messages, so that the user can readily check whether the mail messages sent by him/her have reached the correct persons.

According to a second aspect of the present invention, there is provided a system for sending electronic mail messages (emails) over a network such as the internet, comprising a mail processing unit which can be connected to the network for the purpose of processing outgoing electronic mail messages, wherein the mail processing unit comprises:
first input means allowing a user to enter text, image or sound data;
generating means for generating on the basis of the input data an electronic mail message to be authorized;
addressing means for addressing the generated unauthorized mail message;
storage means for storing the generated unauthorized mail message;
display means for showing the unauthorized mail message to a previously specified supervisor associated with the user;
second input means for allowing the supervisor to enter an authorization code;
sending means which are adapted to send, only after receipt of the authorization code, the authorized electronic mail message over the network to the addressee.

According to a first preferred embodiment, the sending means are also adapted to send unauthorized mail messages over the network to the addressee without authorization of the supervisor. A user can hereby continue to send for instance private messages without these being viewed by a supervisor. Such messages do not however have an authorized status. In another, stricter preferred embodiment the sending means are however adapted to block the sending of all unauthorized mail messages, which means that a user can only sent messages after monitoring by a supervisor.

In the above embodiments the mail processing unit can comprise a personal computer, including a standard email server. The method can be implemented in a computer program running on such a computer. The computer program can herein run separately, i.e. independently of a standard email program installed on the computer, such as Microsoft™ Outlook, can operate together with the standard email program as so-called add-on program, or can be fully incorporated in an email program.

The invention also relates to a-data carrier having stored thereon a computer program product, upon the execution of which on a computer system the method described herein is performed.

Finally, the invention also relates to a computer program for performing the steps of the methods defined herein when the program runs on one or more computers or on the system described herein.

Further advantages, features and details of the present invention will be elucidated in the following description of a preferred embodiment thereof. Reference is made in the description to the following figures.

Figure 1:
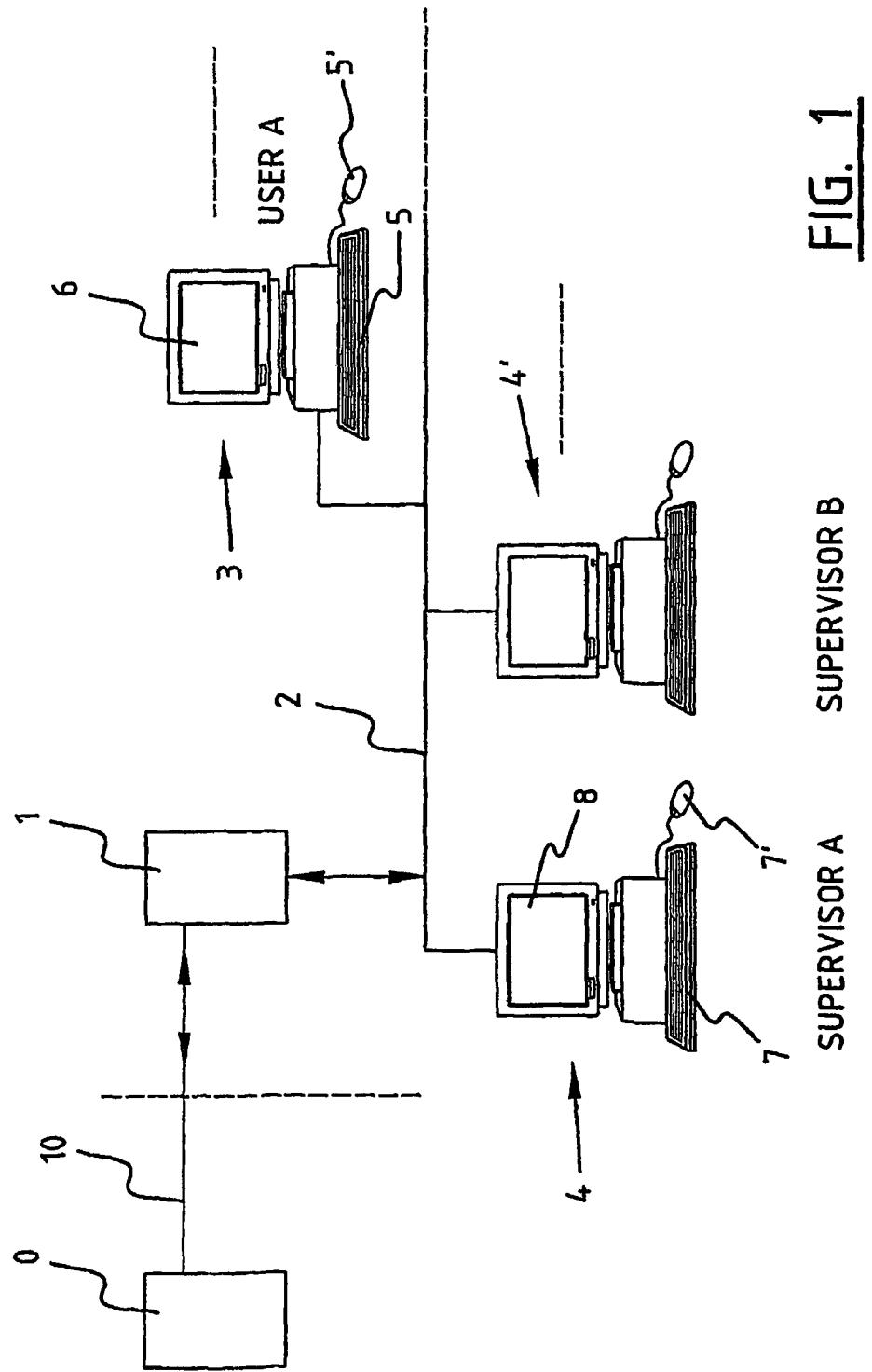
FIG. 1 is a schematic view of a preferred embodiment of the system according to the invention.

FIG. 1 shows schematically a preferred embodiment of the system for processing electronic mail message (emails). The system comprises a mail server 1 coupled via an internal network 2 to a number of computers, including user computers 3 and supervisor computers 4,4'. Mail server 1 is further connected to an external network 10, such as for instance the internet. Mail server 1 and the other computers 3,4,4' each comprise, among other parts, a central processing unit and storage means co-acting therewith, such as a memory of the RAM and ROM type, a hard disk, floppy disk, an optical read device for reading optical disks, and the like. The other computers 3,4,4' also comprise input means, for instance in the form of a keyboard 5, 7 respectively or a mouse 5', 7' respectively and a display 6, 8 respectively. Mail server 1 and computers 3,4,4' can be loaded in known manner with computer software in order to program the system such that the method steps described herein can be performed.

Other configurations (not further shown here) of the system are likewise possible. It is for instance possible to provide the different users and the supervisors, in accordance with the "thin client" principle, with terminals directly connected to the central mail server 1. The terminals only comprise the minimal hardware (display, keyboard and interface with network 2) required to establish communication with the central mail server 1. Generating of the mail messages now takes place by the mail server 1 itself instead of by the separate user and supervisor computers 3, 4, 4'. Other further configurations are likewise possible.

In the following the assembly of user computers, supervisor computer and mail server, or the units corresponding therewith in the alternative configurations, will also be referred to as mail processing unit.

In known manner the users of the system can generate an electronic mail message with their user computers 3, for instance by operating the keyboard 5 connected to user computers 3. The supervisor can also generate electronic mail messages. The mail messages can be sent via the internal network 2 with mail server 1, which mail server 1 in turn sends the generated mail messages via external network 10 to one or more addressees, such as the personal computer O shown schematically in FIG. 1. It will be apparent that the number of users and the number of supervisors can vary. The supervisor computer 4 of a supervisor with limited authority can also be perceived as user computer, wherein a second supervisor computer 4' of a supervisor with more extensive authority then monitors the mail messages generated by supervisor computer 4.

Figure 2:
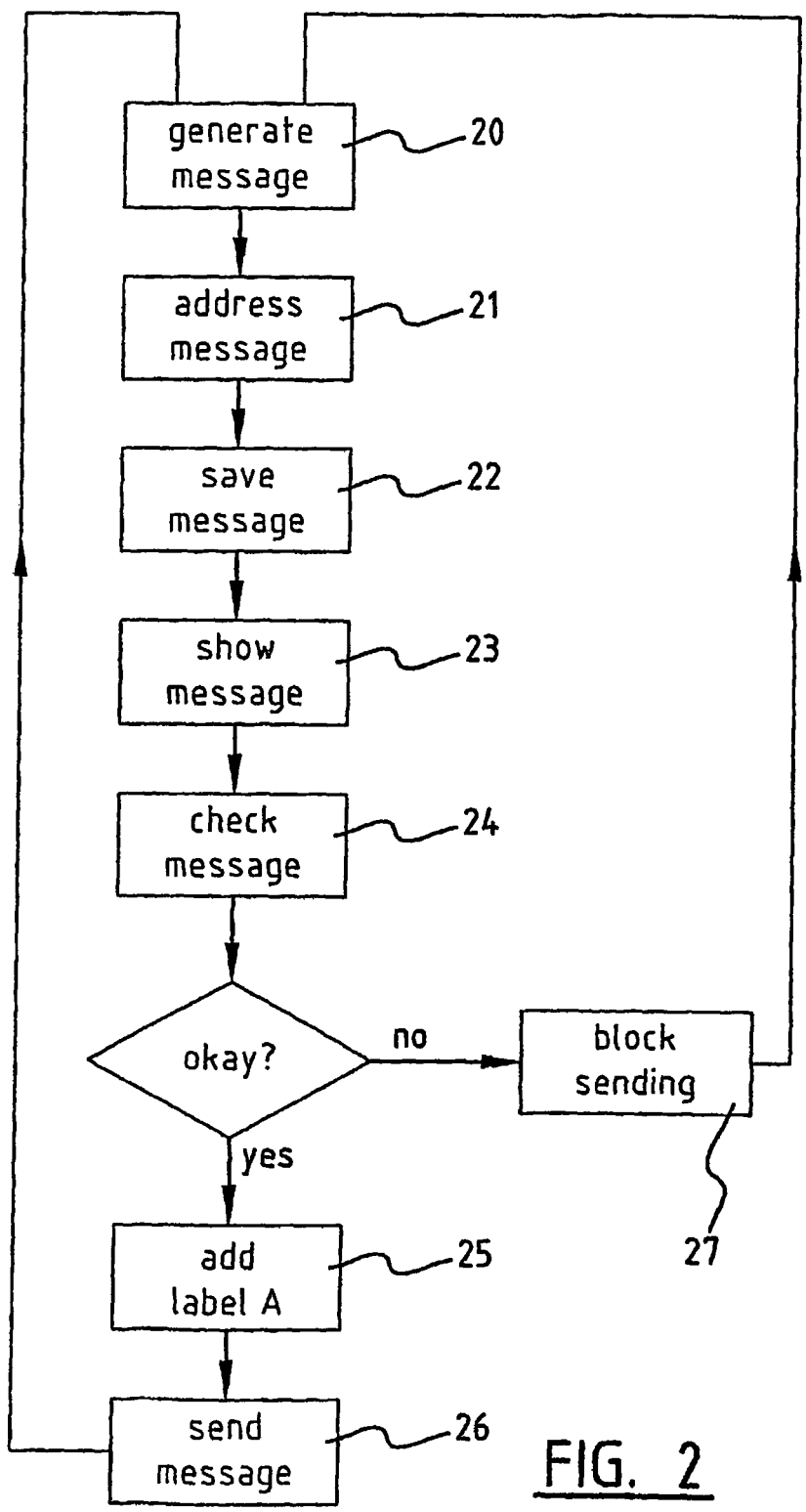
FIG. 2 is a flow diagram showing a number of the steps of the method according to the invention.

A user of the system proceeds as follows. First of all the user generates (step 20, FIG. 2) an electronic message in known manner by operating the button "new" (30 in FIG. 3), whereby a new input screen 31 (FIG. 4) is displayed on the screen. The user inputs for instance text via input means 5, for instance a keyboard, a voice recognition device, etc. The mail message can also contain image data and/or sound data in addition to text data. Video or sound fragments can thus be added to each text message, either as attachment or directly in the mail message itself, or graphic objects and the like can be inserted directly into the message.

When the message has thus been generated, the user enters (step 21) via the address input field 33 one or more email addresses of the persons who must receive the relevant email. Addressing can of course also take place prior to input of the text of the mail message or during inputting thereof.

Figure 3:
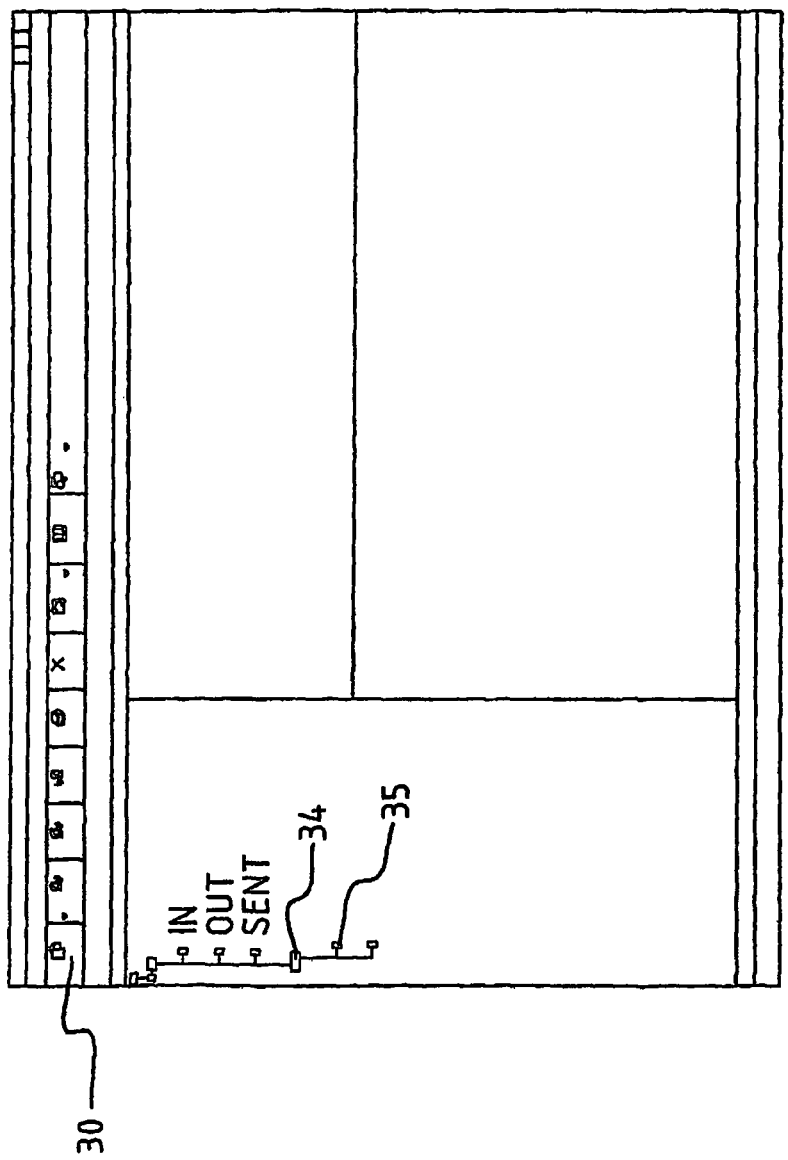
FIG. 3 is a schematic view of the startup screen shown to a user and a supervisor.
Figure 4:
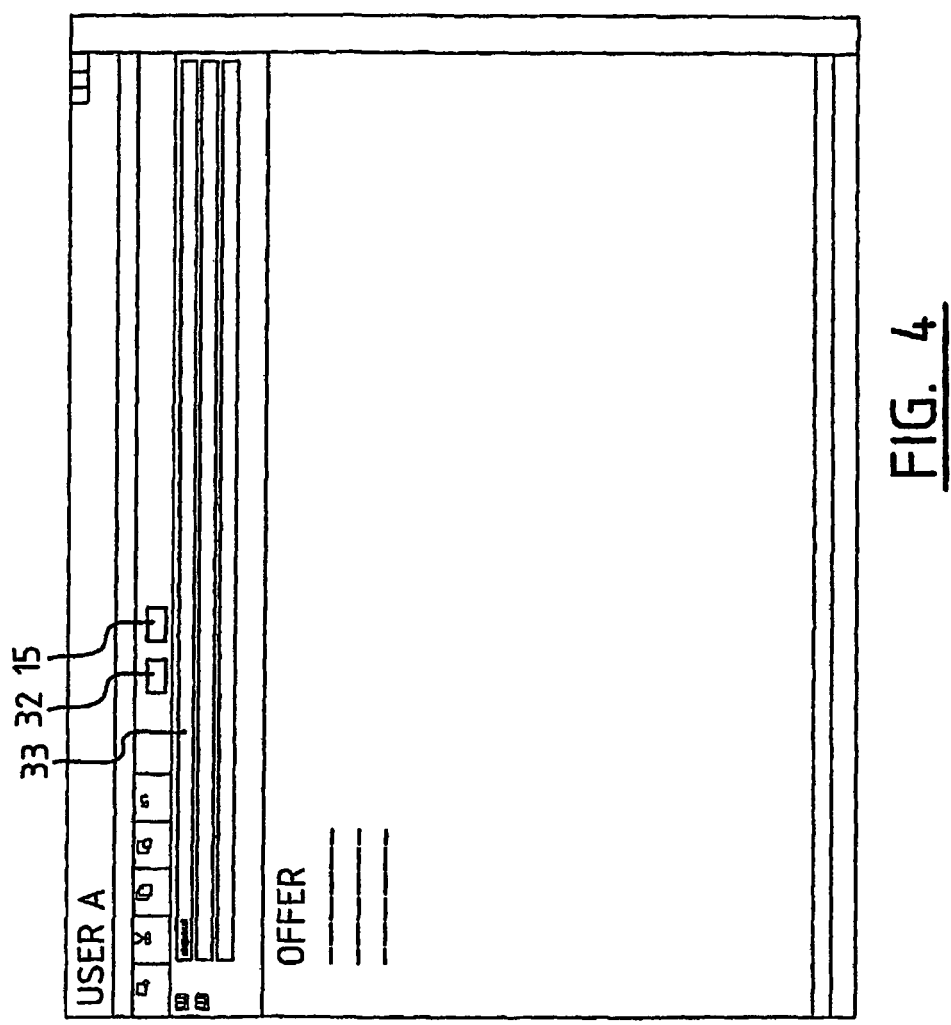
FIG. 4 is a schematic view of a following screen shown to a user.

After having generated the mail message and inputted the addresses of the addressee, the user operates the "send" button 32, as shown in FIG. 4, whereby the mail message is ready for sending as far as the user is concerned. Instead of actually sending the mail message to the addressee(s), the mail processing unit places the message in the "outgoing mail" directory (directory for outgoing mail to be supervised as designated with reference numeral 34 in FIG. 3), in particular in a directory (as designated in FIG. 3 with reference numeral 35) associated with the relevant user (user A) of one of the supervisors associated with the user and thus saves (step 22 in FIG. 2) the mail message on the storage means of the mail processing unit.

In which outgoing mail directory the generated mail message is placed depends on relations, pre-stored in the mail processing unit, between the users of the system and the different supervisors.

In the shown example the message generated by user A goes to the outgoing mail directory of supervisor B (FIG. 3). When supervisor B inspects his display 8, the message of user A is shown on the display (step 23 in FIG. 2) in the directory for outgoing mail to be supervised 34 of supervisor B.

Figure 5:
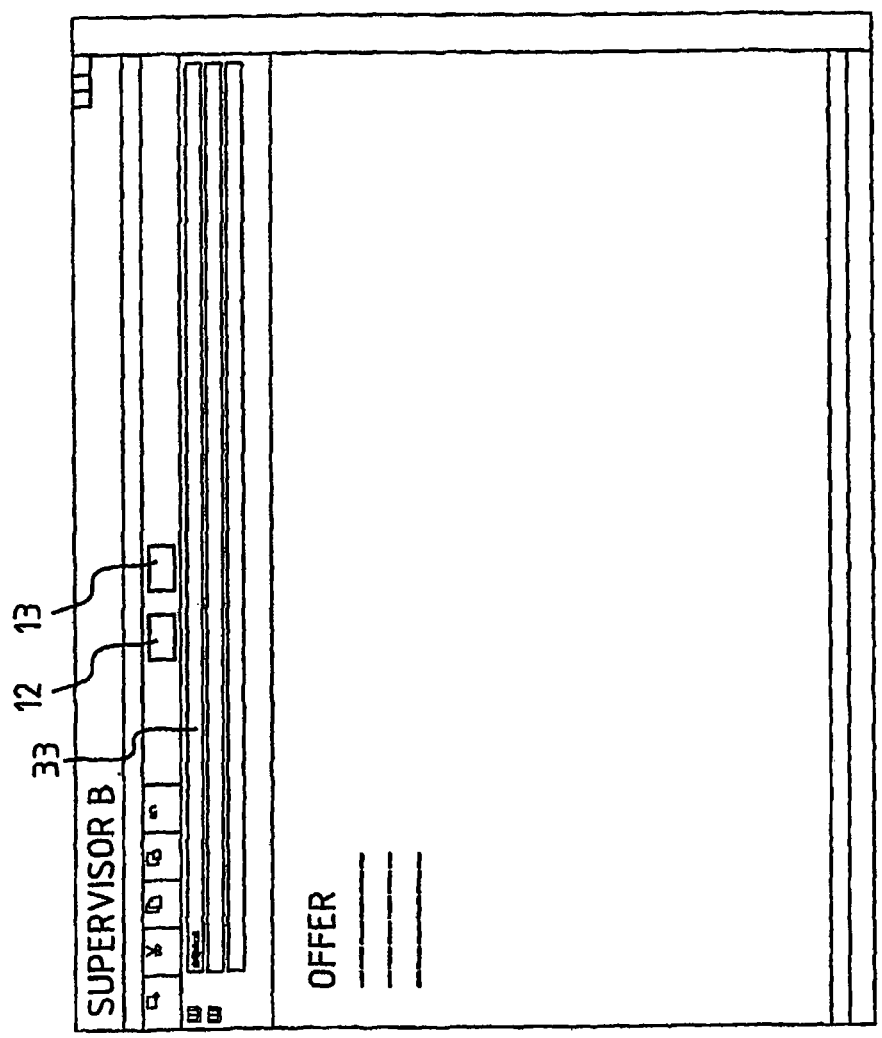
FIG. 5 is a schematic view of a following screen shown to a user.

Since the specific message has not yet been checked by the supervisor it is given a colour indication, for instance red, and/or a specific symbol or specific designation which is representative of the unauthorized status of the mail message. Supervisor B subsequently opens the mail message to be authorized and is shown the window in FIG. 5. Supervisor B checks (step 24) the content of the message. If the supervisor approves the content of the mail message, he/she operates an "agreed" button 12 (FIG. 3) so as to indicate that, as far is he/she is concerned, the relevant message is approved.

Figure 6:
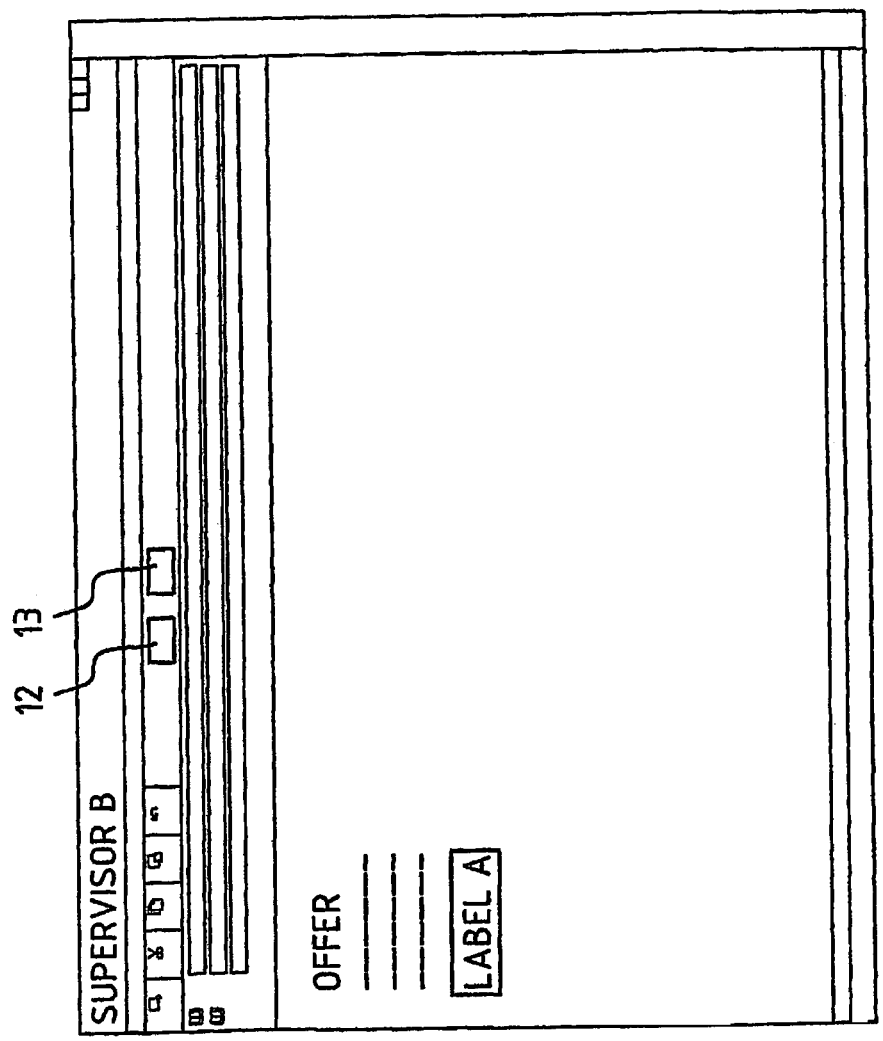
FIG. 6 shows an example of an authorized mail message.

After receiving the agreement of supervisor B, the mail processing unit adds (step 25) a text pre-stored in the storage means to the authorized message, for instance at the bottom thereof as shown in FIG. 6. Added in FIG. 6 is a label which states for instance that the relevant message has been checked by a supervisor and that the recipient(s) of the message may therefore assume that the content of the message is correct. The thus modified mail message is then sent (step 26) by the mail processing unit to the addressee(s) via external network 10. When the addressee opens the received mail message, he/she sees immediately that the relevant mail message has been authorized, and that the content thereof is correct since an indicator in the form of a determined standard text has been added to the mail message.

If supervisor B does not agree with the content of the mail message, sending thereof is blocked (step 27). The message then remains in the outgoing mail directory of supervisor B without being sent.

In another embodiment the supervisor B can indicate by means of operating a "not approved" button 13 that he/she will not authorize the message. In this case the message is either removed or a communication is sent to user A informing user A of the fact that the mail message has not been authorized. User A then has the possibility of optionally amending the message and sending it to the supervisor once again.

Figure 7:
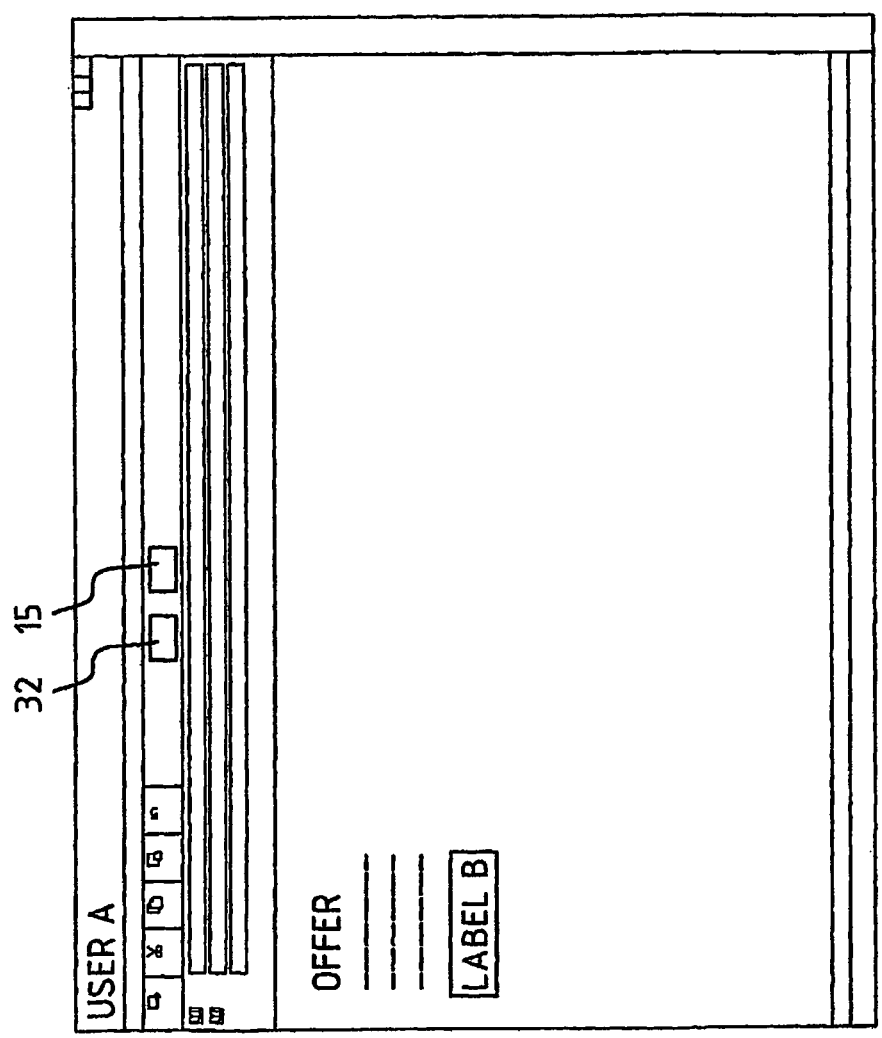
FIG. 7 shows an example of an unauthorized mail message.

In some embodiments a mail message is not sent without authorization by a supervisor. Other embodiments do however incorporate the option of allowing the user to send unauthorized mail messages, for instance private messages or messages with content not requiring authorization. In such an embodiment the user generates a mail message and sends it by operating the "send unauthorized message" key 15. After the "send unauthorized message" key 15 has been operated, the mail processing unit adds a label B to the non-authorized message, for instance at the bottom of the message, as shown in FIG. 7. This label for instance contains a text indicating that the present mail message has not been authorized and therefore no liability can be accepted for the content thereof. Only after label B has been added is the mail message, including label B, sent via external network 10 to the addressee(s). When the mail message is opened the addressee is in this case immediately informed of the unauthorized status of the message. In the shown example this also means that the sender of the mail message does not accept liability for the content of the message.

In some cases the possibility is also incorporated of the supervisor him/herself sending a message or sending a message from a user for which no authorization is given. In this case the supervisor operates the "not approved" button 13, so that the mail processing unit adds an indicator, for instance the above mentioned label B, to the non-authorized ID message in order to clarify the status of the mail message to the recipient thereof.

It will be apparent that in analogous manner a supervisor can be monitored as a user of the system by a further supervisor. It is also possible to have each message of a user monitored first by a first supervisor and thereafter, after authorization by the first supervisor, to have it monitored by a second supervisor, possibly a supervisor with more authority than the first supervisor. A layered authorization structure can thus be developed which takes into account the levels of authority prevailing within the company.

In a further preferred embodiment the system is adapted, when a third party sends a mail message to the mail processing unit of a user, which user is for one reason or another unable to respond to the message, to send back a message to the third party stating that the user cannot respond to the received mail message. If the user is absent from the office for a determined period of time, a mail message can for instance be sent in which the label contains a standard message, such as "The recipient of this message is not present in the office and cannot answer your mail message". Such a mail message is also referred to as an "out of office reply". The mail processing unit can optionally send a received message to, or at least make it readable for, another user or a supervisor, so that the other user or supervisor can deal with the mail message. In such a case a statement to this effect can be included in a mail message, preferably the above mentioned mail message, and sent to the third party.

In a particular preferred embodiment of the invention, it is possible, if the addressee cooperates by sending a receipt confirmation requested by the sender of the mail message sent via the system, that this receipt confirmation, i.e. a technical receipt confirmation and/or a read receipt confirmation, is not placed in the "in-box" of the computer system but is coupled as a marking to the originally sent mail message. This provides the sender with the option of generating an overview of the mail messages sent by him/her and actually received by the intended recipients(s).

The present invention is not limited to the above described preferred embodiments thereof. The rights sought are defined by the following claims, within the scope of which many modifications can be envisaged.

The invention claimed is:

1. Method for sending electronic mail messages (emails) via an external network such as the internet through a mail processing unit coupled to an internal network, comprising:
generating at a user computer that is part of the internal network a user's electronic mail message to be reviewed, wherein the mail message comprises text, image or sound data;
addressing the generated unreviewed mail message by the mail processing unit; temporarily storing the generated unreviewed mail message at the mail processing unit;
mandatorily showing the unreviewed mail message to a previously specified supervisor associated with the user computer that is part of the internal network;
sending the electronic mail message to the addressee over the external network only after review of the content of the mail message by the supervisor; and
linking each of the users of the mail processing unit to one or more associated supervisors, by making use of relations between the different users and supervisors that are pre-stored in the mail processing unit, wherein the step of addressing the generated unreviewed mail message by the mail processing unit comprises addressing the supervisor linked to the user that generated the mail message,
characterized in that the step of sending the mail message to the addressee over the external network comprises adding to the reviewed mail message a display indicator indicating whether or not the content of the mail message has been approved by the supervisor associated with the user's computer and then sending the mail message with the added display indicator to the addressee regardless whether or not the content of the mail message has been approved.

2. Method as claimed in claim 1, further comprising sending the display indicator along with the mail message to the addressee.

3. Method as claimed in claim 1, comprising incorporating the display indicator into the content of the mail message.

4. Method as claimed in claim 1, wherein the display indicator is a label added to the content of the mail message.

5. Method as claimed in claim 4, wherein the label contains information, in particular text data, representative of the review status of the content of the mail message.

6. Method as claimed in claim 1 further comprising: if the mail message is approved, retrieving a first text and adding the first text to the generated content of the mail message; and if the mail message is unapproved, retrieving a second text differing from the first text and adding the second text to the generated content of the mail message.

7. Method as claimed in claim 1, further comprising of generating an electronic mail message to be sent without review, addressing the generated mail message and sending the unreviewed mail message to the addressee over the external network.

8. Method as claimed in claim 1 further comprising of blocking the sending of all unreviewed mail messages.

9. Method as claimed in claim 1, further comprising placing the generated mail message in a directory intended for the supervisor and blocking sending of the mail message until the mail processing unit has received an approval message from the supervisor.

10. Method as claimed in claim 1, wherein the display indicator comprises a digital signature of the supervisor.

11. Method as claimed in claim 1 further comprising showing the user the approval status added by the supervisor to the content of the mail message generated by the user.

12. Method as claimed in claim 1 further comprising showing the supervisor whether or not messages generated by one or more users have already been approved by said supervisor.

13. Method as claimed in claim 11, wherein whether the content of a mail message is approved or unapproved is shown with different colors or different symbols.

14. Method as claimed in claim 1 further comprising linking each of the users of the mail processing unit to one or more associated supervisors.

15. Method as claimed in claim 1 further comprising, after sending an electronic mail message, receiving an electronic receipt confirmation message generated from at least one of the addressees and linking the receipt confirmation message to the originally sent electronic mail message.

16. Method as claimed in claim 15, comprising making an overview of the electronic mail messages sent by the user and electronic receipt confirmation messages received by the mail processing unit from at least one addressee.

17. Non-transitory computer-readable medium having stored thereon a computer program product, upon the execution of which on a computer system the method as claimed in claim 1 is performed.

18. System including a server with a processor and a memory for sending electronic mail messages (emails) over an external network such as the internet, comprising a mail processing unit which can be connected to the external network and an internal network for the purpose of processing outgoing electronic mail messages, wherein the system comprises:
first input means allowing a user to enter text, image or sound data;
generating means for generating on the basis of the input data at the first input means an electronic mail message to be reviewed;
addressing means for addressing the generated unreviewed mail message;
storage means for storing the generated unreviewed mail message within the internal network;
display means for mandatorily showing the content of the unreviewed mail message to a previously specified supervisor associated with the user that is part of the internal network;
second input means allowing the supervisor to enter a review code; sending means which is adapted to send, only after receipt of the review code, the electronic mail message over the external network to the addressee; and means for linking each of the users of the mail processing unit to one or more associated supervisors, by making use of relations between the different users and supervisors that are pre-stored in the mail processing unit, wherein the addressing means for addressing the generated unreviewed mail message by the mail processing unit comprises means for addressing the supervisor linked to the user that generated the mail message, characterized in that the sending means is admitted to add to the generated mail message a display indicator indicating whether or not the content of the mail message has been approved by the supervisor associated with the user and to then send the mail message with the added display indicator to the addressee regardless whether or not the content of the mail message has been approved.

19. System as claimed in claim 18, wherein the adding means is adapted to send the display indicator along with the mail message to the addressee.

20. System as claimed in claim 18, wherein the sending means is adapted to incorporate the display indicator into the content of the mail message.

21. System as claimed in claim 18, wherein the display indicator is a label added to the content of the mail message.

22. System as claimed in claim 21, wherein the label contains information, in particular text data, representative of the review status of the content of the mail message.

23. System as claimed in claim 18, wherein the sending means is adapted so as to retrieve a first text and adding the first text to the generated content of the mail message if the mail message is approved and to retrieve a second text, different from the first text and adding the second text to the generated content of the mail message if the mail message is unapproved.

24. System as claimed in claim 18, wherein the sending means are also adapted to send unauthorized mail messages over the external network to the addressee without review of the supervisor.

25. System as claimed in claim 18, wherein the sending means is adapted to block the sending of all unreviewed mail messages.

26. System as claimed in claim 18, which is adapted to place the generated mail message in a directory intended for the supervisor and to block sending of the mail message until the mail processing unit has received an approval message from the supervisor.

27. System as claimed in claim 26, comprising signature generating means for generating an electronic signature as the indicator.

28. System as claimed in claim 18, which is adapted to show the user on a second display means the review status of the content of the mail message generated by the user.

29. System as claimed in claim 28, wherein whether the content of a mail message is approved or unapproved is shown with different colors or different symbols.

30. System as claimed in claim 18, which is adapted to show the supervisor on the first display means whether or not the content of the mail messages generated by one or more users have already been approved by said supervisor.

31. System as claimed in claim 18, comprising receiving means for receiving electronic mail messages, in particular for receiving a receipt confirmation message, and linking means for linking the receipt confirmation message to the originally sent mail message.

32. System or method as claimed in claim 18, wherein the mail processing unit comprises a personal computer.

33. Non-transitory computer program for performing the steps of claim 1 when the program is run on one or more computers or on the system for sending electronic mail messages (emails) over a external network such as the internet, comprising a mail processing unit which can be connected to the external network and an internal network for the purpose of processing outgoing electronic mail messages, wherein the computer program comprises:

first input means allowing a user to enter text, image or sound data;

generating means for generating on the basis of the input data at the first input means an electronic mail message to be reviewed;

addressing means for addressing the generated unreviewed mail message;

storage means for storing the generated unreviewed mail message within the internal network;

display means for showing the unreviewed content of the mail message to a previously specified supervisor associated with the user that is part of the internal network;

second input means allowing the supervisor to enter a review code;

sending means which is adapted to send, only after receipt of the review code, the electronic mail message over the external network to the addressee; characterized in that the sending means is admitted to add to the generated mail message a display indicator indicating whether or not the content of the mail message has been approved by the supervisor associated with the user and to then send the mail message with the added display indicator to the addressee regardless whether or not the content of the mail message has been approved; and means for linking each of the users of the mail processing unit to one or more associated supervisors, by making use of relations between the different users and supervisors that are pre-stored in the mail processing unit, wherein the addressing means for addressing the generated unreviewed mail message by the mail processing unit comprises means for addressing the supervisor linked to the user that generated the mail message.

* * * * *